(12) United States Patent
Knox

(10) Patent No.: US 7,076,999 B1
(45) Date of Patent: Jul. 18, 2006

(54) TIRE PRESSURE MONITORING SYSTEM

(76) Inventor: Lewis Lee Knox, 1530 N. Sycamore Ave., Rialto, CA (US) 92376

( * ) Notice: Subject to any disclaimer, the term of this patent is extended or adjusted under 35 U.S.C. 154(b) by 80 days.

(21) Appl. No.: 11/010,162

(22) Filed: Dec. 13, 2004

Related U.S. Application Data

(63) Continuation-in-part of application No. 10/073,575, filed on Feb. 12, 2002, now abandoned, which is a continuation-in-part of application No. 09/753,391, filed on Jan. 4, 2001, now abandoned.

(60) Provisional application No. 60/260,657, filed on Jan. 11, 2001.

(51) Int. Cl.
*B60C 23/02* (2006.01)

(52) U.S. Cl. .................................................. 73/146.3

(58) Field of Classification Search ............... 73/146.5, 73/146.3; 702/138; 340/442
See application file for complete search history.

(56) References Cited

U.S. PATENT DOCUMENTS

| | | | | |
|---|---|---|---|---|
| 4,163,208 A | * | 7/1979 | Merz | 340/447 |
| 5,130,694 A | * | 7/1992 | Zainaleian | 340/442 |
| 5,526,861 A | * | 6/1996 | Oshita et al. | 152/415 |
| 5,814,725 A | * | 9/1998 | Furuichi et al. | 73/146.5 |
| 5,924,055 A | * | 7/1999 | Hattori | 702/138 |
| 6,647,771 B1 | * | 11/2003 | Burns | 73/146 |

* cited by examiner

*Primary Examiner*—Jewel V. Thompson
(74) *Attorney, Agent, or Firm*—Our Pal LLC; Pal Asija

(57) ABSTRACT

A System of monitoring the air pressure in the tires of a moving vehicle continuously in real time for measuring the pressure in a rotating tire and transmitting the information via magnetic pulses to a sensor pickup located near the tire, but on a non-rotating part of the vehicle, for transmittal via wire to a micro controller for conversion to air pressure units and display. It comprises a sensor module for each wheel, and an electronics module in the passenger compartment. It computes the air pressure by measuring the phase angle between a fixed magnet and a magnet placed on a piston in an air cylinder within the tire.

10 Claims, 4 Drawing Sheets

Figure 3:
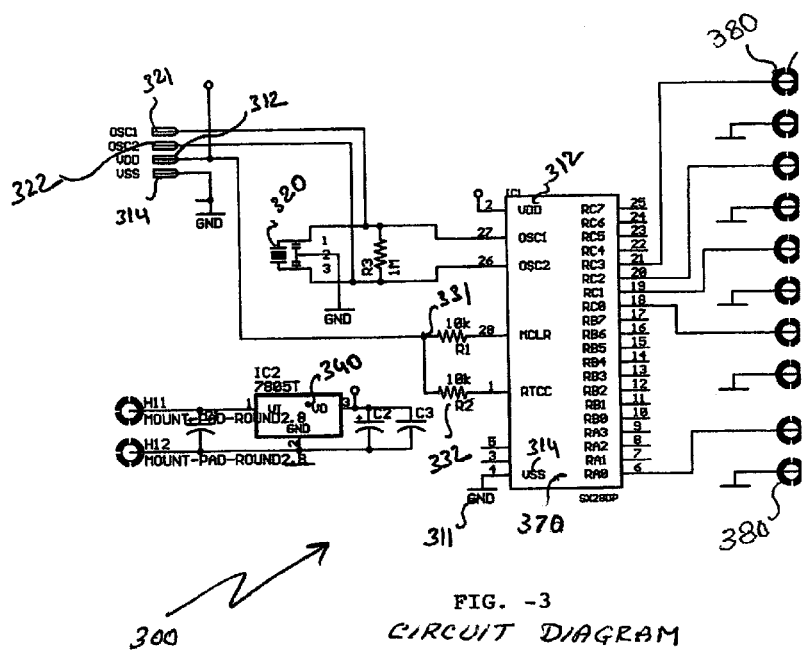

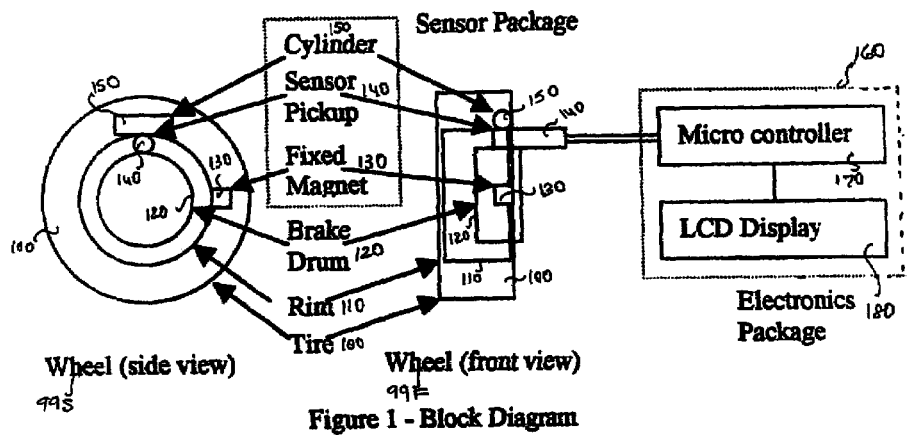
Figure 1 - Block Diagram
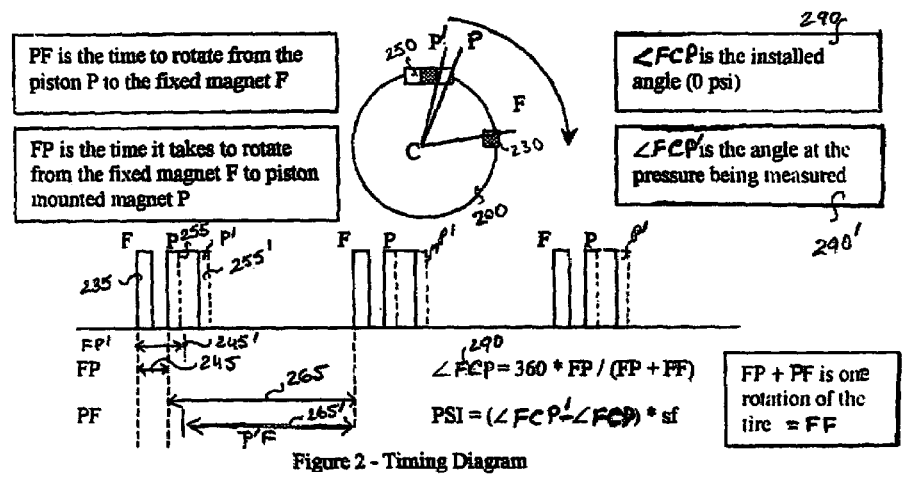
Figure 2 - Timing Diagram

CIRCUIT DIAGRAM

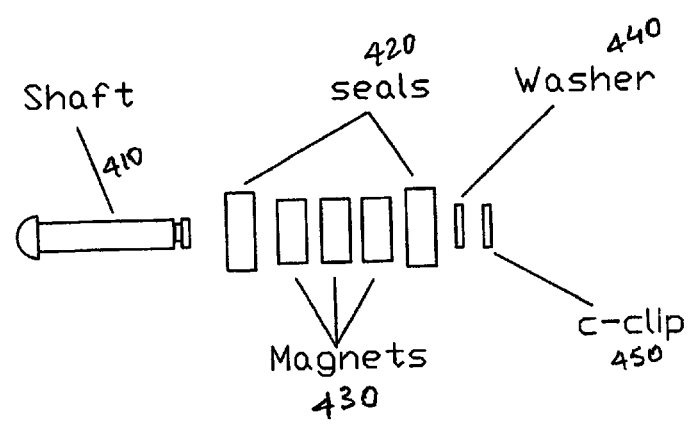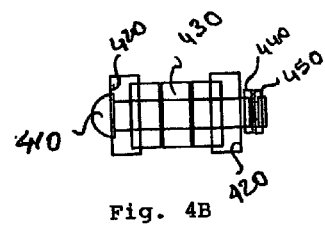
Fig. 4A
Fig. 4B

TIRE PRESSURE MONITORING SYSTEM

RELATED APPLICATIONS

This application is a Continuation-In-Part application to non-provisional application Ser. No. 10/073,575 filed Feb. 12, 2002 now abandoned which in turn was a Continuation-In-Part application to non-provisional application Ser. No. 09/753,391 filed Jan. 4, 2001 now abandoned claiming priority from provisional application Ser. No. 60/260,657 filed Jan. 11, 2001 all of which are based on and relate to Disclosure Document Number 450,235 dated Jan. 25, 1999 then entitled Computerized Air Pressure System invented by Lewis Knox.

BACKGROUND

This invention relates generally to motor vehicle safety by continuously monitoring the tire pressure in real time so as to prevent accidents caused by over or under inflated tires. More particularly it relates to a system for the transmission of air pressure information from inside a rotating tire to the non-rotating portion of a tire of motor vehicle, from whence it can be displayed. Such a system must of necessity employ a method of wireless transmission from the rotating to the non-rotating components. Prior art involves the use of slip rings or radio transmission to obtain the desired effect.

THE PROBLEM

The problem with prior art tire pressure monitoring system is that they are intrusive and do not monitor pressure continuously in real time. They involve the use of slip rings or radio transmission. They are not effective, affordable, quick, simple, safe or convenient.

This invention solves these problems in a simple, aesthetic and elegant manner. The problems with prior art systems can be categorized into the following:
1. Prior art systems use active components such as a radio signal to transmit the pressure from within the tire to a receiver. Radio transmissions are subject to interference and must meet FCC regulations.
2. They are invasive requiring puncturing some component through the tire wall.
3. The active components require a local power source, commonly a battery. These power sources must be renewed periodically. Batteries are prone to leakage and behave differently depending on the temperature.
4. They do not provide continuous, real time convenient digital display on the dashboard easily readable in any ambient light and environment.

SUMMARY

A system for measuring the pressure in a rotating tire and transmitting the information via magnetic pulses to a sensor transducer located near the tire, but on a non-rotating part of the vehicle, for transmittal via electrical conductors to a micro controller for conversion to air pressure units and display.

The tire pressure monitoring system of this invention is used to monitor the air pressure in the tires of a motor vehicle continuously and in real time. It comprises a sensor module for each wheel and an electronics module in the passenger compartment or the driver cab or the cockpit or the like. It computes the air pressure by measuring the phase angle between a fixed magnet and a magnet placed on a piston in an air cylinder within each tire of the motor vehicle.

PRIOR ART

A formal prior art search was not conducted or commissioned by the inventor but the inventor is intimately familiar with the prior art. Prior art systems use active components such as a radio signal to transmit the pressure from within the tire to a receiver. The active components require a local power source, commonly a battery. These power sources must be renewed periodically. Batteries are prone to leakage and behave differently depending on the temperature. Radio transmissions are subject to interference and must meet FCC regulations. In short prior art has attempted to solve this problem by merely developing more convenient easy to read digital ad hoc tire pressure measuring devices.

OBJECTIVES

Unfortunately none of the prior art devices know to the applicants or their attorney singly or even in combination provide for all of the objectives as established by the inventor for this system as enumerated below.
1. It is an objective of this invention to provide methods, devices and system for promoting motor vehicle safety or any transport vehicle employing tires.
2. Another objective of this invention is to provide continuous real time display on the dashboard of the motor vehicle.
3. Another objective of this invention is to transmit the signal from the rotating part of the tire to the non-rotating part of the tire without any commutators, slip rings or radio transmission. This obviates FCC approvals.
4. Another objective of this invention is to obviate the need for a local power supply near the tire by relying exclusively on the motor vehicle direct current voltage battery. This obviates the problem of local battery leakage and/or periodic replacement.
5. Another objective of this invention is that its use be intuitive which requires no further training.
6. Another objective of this invention is that it be amenable to multiple uses.
7. Another objective of this invention is that it use little or no additional energy.
8. Another objective of this invention is that the invention use modular standard components easily interface-able to each other.
9. Another objective of this invention is that it be reliable such that it practically never fails and requires little or no maintenance.
10. Another objective of this invention is that it be environmentally responsible and safe.
11. Another objective of this invention is that it promote and enhance safety by preventing accidents due to under or over inflated tires and further that it be physically safe in normal environment as well as accidental situations.
12. Another objective of this invention is that it be long lasting made from durable material that is water proof, wrinkle proof etc.
13. Another objective of this invention is that it meet all federal, state, local and other private standards guidelines, regulations and recommendations with respect to safety, environment, and energy consumption.
14. Another objective of this invention is that it be suitable for both OEM as well as retrofit markets.

15. Another objective of this invention is that it be suitable for gift giving and for promotional give aways complete with message of the sponsor such as a casino or church such that it can be easily installed by a DIY consumer motor vehicle owner.

Other objectives of this invention reside in its simplicity, elegance of design, ease of manufacture, service and use and even aesthetics as will become apparent from the following brief description of the drawings and the detailed description of the concept embodiment.

Figure 5:
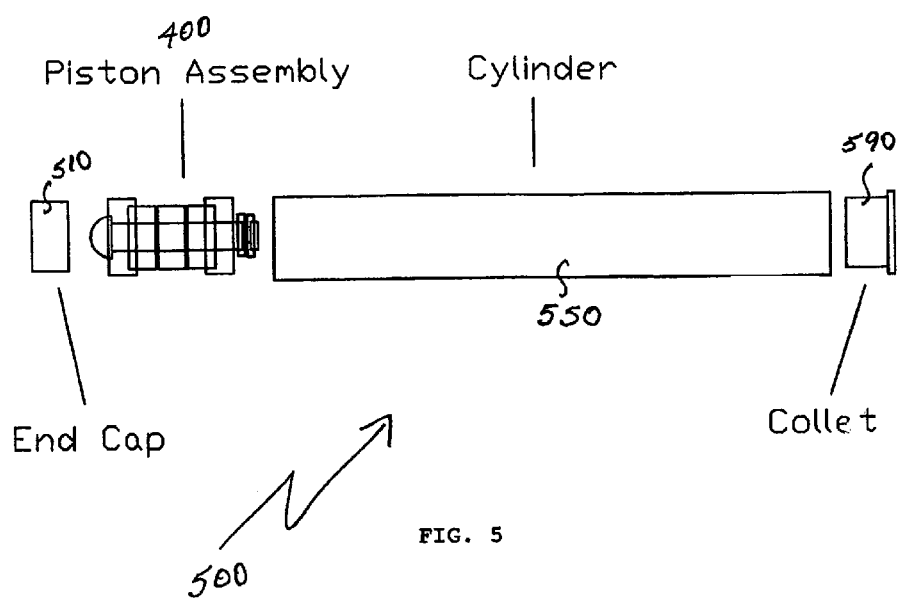
Figure 6:
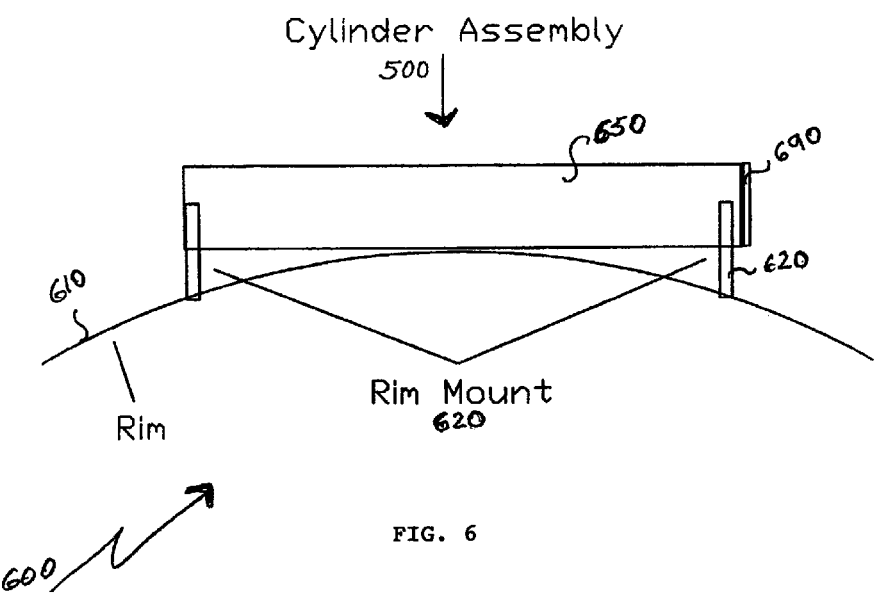

BRIEF DESCRIPTION OF THE DRAWINGS a) FIG. 1 is a Block Diagram of the tire pressure monitoring system of this invention.

b) FIG. 2 is Timing Diagram of the tire pressure monitoring system of this invention.

c) FIG. 3 is an Electronics Schematic diagram of the tire pressure monitoring system of this invention.

d) FIG. 4 shows the Piston Assembly of the tire pressure monitoring system of this invention.

e) More specifically FIG. 4(A) shows Exploded side View of the piston assembly of the tire pressure monitoring system of this invention.

f) Likewise FIG. 4(B) shows the assembled side vide of the piston of the tire pressure monitoring system of this invention.

g) FIG. 5 shows Cylinder Assembly Exploded View of the tire pressure monitoring system of this invention.

h) FIG. 6 shows the Rim Assembly Exploded View of the tire pressure monitoring system of this invention.

DETAILED DESCRIPTION OF BEST MODE PREFERRED EMBODIMENT

The continuous real time tire pressure monitoring system of this invention as shown in the various drawings wherein like numerals represent like parts throughout the several views, there is generally disclosed in FIG. 1 is a Block Diagram of the tire pressure monitoring system of this invention complete with Front view of a wheel 99-F, Side view of a wheel 99-S, Tire generally 100, Rim 110, Brake Drum 120, Fixed Magnet 130, Sensor Transducer 140, Cylinder 150, Electronics module 160, Microcontroller including a microprocessor 170 and Liquid Crystal or comparable display device 180.

The air pressure is measured by the displacement of a piston 140 in a cylinder 150. By attaching a magnet to the piston in the air cylinder a magnetic field is generated around the piston. The reference point for computation may be obtained by vertically aligning piston to the center of the magnetic field, and or a horizontally aligned piston a separate reference magnet. The displacement of the piston is sensed by one of several pickups 140 sensitive to magnetic fields such as a reed switch or a Hall effect switch etc. The sensor pickup transduces the magnetic field into an electrical stream of digital pulses. A subset of the pulses is associated with the pistons magnet and another subset with the reference magnet. By timing the pulses one computes the angular displacement from the piston to reference. The higher the resolution of the timer, the more accurate the reading. Thus the accuracy is directly proportional to the timer clock frequency stability. Hence the inventor in the preferred embodiment used a crystal to precisely control the clock frequency. By knowing the radius to the piston one can compute the linear displacement of the piston given the angular displacement. The air pressure in the tire is proportional to the linear displacement. Once the air pressure is computed it may displayed using anyone of several computer driven display technologies such CRT (Cathode Ray Tube), LED (Light Emitting Diodes), and LCD (Liquid Crystal Displays) etc.

The Sensor Module

A critical and unique component in the system is the sensor module. Each wheel 99 on the vehicle is equipped with a sensor module, which in turn comprises three parts as follows:

1) A fixed magnet 130
2) An air cylinder with a magnet mounted on the piston 150
3) A sensor pickup and its mounting bracket 140

In the preferred embodiment the inventor used Neodymium Iron Boron (Nd2Fe14B) magnets. These extremely powerful magnets are required to extend the magnetic field through the rim. Two electrical conductors communicate the signal from the sensor pickup to the electronics module.

The Electronics Module

FIG. 2 is Timing Diagram of the tire pressure monitoring system of this invention showing Tire 200, the location of the Fixed magnet 230, Pulse 235 generated by the fixed magnet 230, Time &/or distance between fixed magnet pulse and the piston magnet pulse in nominal position 245, Time &/or distance between fixed magnet pulse and the piston magnet pulse in inflated position 245', Pulse generated by Piston Mounted Magnet in nominal position 255, Pulse generated by Piston Mounted Magnet in inflated position 255', Time and/or distance between the piston mounted magnet in the nominal position and the next pulse generated by the fixed magnet 265, Time and/or distance between the piston mounted magnet in the inflated position and the next pulse generated by the fixed magnet 265', Angle FCP 290—The angle between the fixed magnet and the piston magnet in the nominal position and the angle FCP' 290'—The angle between the fixed magnet and the piston magnet in the inflated position.

Micro-controller 100, 370 times the pulse generated by the sensor pickup 140. It then calculates the phase angle between the magnets, from which the air pressure is derived, and displays the pressure on a LCD display. For the prototype of the preferred embodiment the inventors used a 50 MHz Ubicom SX 28AC communications controller. The flexible interface of the processor allows the sensor package to be connected directly to it. The LCD display has a 2400-baud serial interface that also connects directly to the processor. For mass production model the inventors recommend a parallel input LCD, because of faster updates and a lower price. In addition there is a power circuit used to regulate the vehicle power to the 5 volts needed by the processor and display.

Pressure is function of phase angle differential between the fixed magnet and the piston magnet before and after. Any change in tire pressure changes this differential. PSI=Angle (FCP'−FCP)*K where FCP=360*FP/(FP+PF). As can be seen FF=FP+PF. Constant K is fixed for a tire and magnet position.

FIG. 3 is an Electronics Schematic diagram of the tire pressure monitoring system of this invention where in 300 represents Schematic diagram generally, 311 is Ground, 312 is Logic power Vdd, 314 is Alternate power Vss, 320 is Crystal for regulating frequency, 321 is Oscillator 1, 322 is Oscillator 2, 331 is 10 K Ohm resistor 1, 332 is 10 K Ohms resistor 2, 340 is Sensor transducer pick up and 370 is Microprocessor as a microcontroller.

FIG. 4 shows the Piston Assembly of the tire pressure monitoring system of this invention. More specifically FIG. 4(A) shows Exploded side View of the piston assembly and FIG. 4(B) shows the assembled side vide of the piston of the tire pressure monitoring system of this invention. In these two figures 400 represents the Piston assembly generally, 410 is Piston Shaft, 420 are a pair of Seals, 430 are plurality of Magnets, 440 is a Washer and 450 is a C-Clip. For piston assembly the inventor recommends the following steps.

a) Place the piston components onto the piston shaft 410 with the seals 420 open sides facing the magnets 430.
   b) B) Clip on the C-Clip 450 to hold the assembly 400 together.

FIG. 5 shows Cylinder Assembly Exploded View of the tire pressure monitoring system of this invention complete with 500 Cylinder assembly generally, 510 is End cap, 550 is Cylinder main body and 590 is Collate. For cylinder assembly 500 the inventor recommends the following steps.

a) Press the end cap 510 into one end of the cylinder main body 550.
   b) Insert the piston 410.
   c) Press the collet 590 into the end.

FIG. 6 shows the Rim Assembly Exploded View of the tire pressure monitoring system of this invention complete with 600 Rim assembly generally, 610 represents the Rim specifically, 620 are a pair of Rim mounts; 650 constitutes the Cylinder main body and 690 is Collet. For rim assembly 600 the inventor recommends the following steps.

a) Affix with EPOXY® or the like adhesive cylinder mounts top the cylinder.
   b) Affix with Epoxy® or the comparable adhesive the cylinder assembly 500 to the rim mounts 620 and the rim 610.

As can be seen in FIG. 6 the air cylinder is mounted to the outside of the rim, inside the tire. The fixed magnet is also mounted within the tire on the outside of the rim, 90 degrees from the open end of the piston. The sensor pickup is mounted within ¾ inch of the inside of the rim on the vehicle i.e. on top of the brake drum or caliper. The sensor pickup is a magnetic relay, similar to those used in security systems. As each magnet in the sensor passes over the sensor pickup the magnetic field causes the relay to close and then re-open after it passes, generating a digital pulse as shown in the timing diagram of FIG. 2.

Alternate Embodiments

It is possible to mount the cylinder 150 vertically instead of horizontally. In this embodiment the fixed magnet is obviated, instead the center of the pistons magnetic field is used for the reference. The leading and trailing edges of the field are timed and the angle is calculated. The angle in this case represents the distance from the sensor pickup to the piston. The math is a little trickier to convert to PSI, so it is recommended that a lookup table should be built from a geometry engine and programmed into the ROM (Read Only Memory) associated with the micro controller.

Magnets are the easiest to handle of the sources that can generate a measurable field that will penetrate the rim. Another such material is radioactive. In this case the inventors suggest replacing the magnets with a radioactive source and the sensor pickup with a particle counter.

Modifying the rim to include a transparent window would allow using a light source and detector reflecting off the piston. Similar non-light based penetrating systems are envisioned as possible alternate embodiments.

Any compressible material, for example an air gel or foam, could replace the air cylinder. The air pockets in the gel or foam act in the same capacity as the air cylinder and eliminate the need for seals. The sensor pickup is a magnetic relay, however magnetic reed switches and Hall Effect switches work just as well, if not better. The electronics module is just a computing and display node, the algorithm is used to calculate the phase angle is well known but may be made more compact through programming. The display node is a LCD display; it could just as easily be 7-segment LED's, indicator lamps, or even a vehicle area network bus such as CAN, I2, RS232C or any other protocol.

The inventors used two conductors but once the system is integrated into the vehicle only one wire is needed as the vehicle ground can serve as the other conductor.

The system can easily be extended to include temperature measurement by attaching a bimetallic spring (with a magnet mounted on it) to the end of the cylinder.

Operation

The manufacturing, assembly and use and operation of this invention is very simple even intuitive. As the tire rotates, the magnets in the sensor module move past the sensor pickup. The sensor pickup senses the magnet fields, causing the relay to close as the field passes over it and open when it has passed, generating a series of digital pulses through the wires connecting it to the micro-controller. The micro-controller contains a program which times the pulses accurately to within several microseconds (this directly affects the pressure accuracy). The times are processed and the phase angle between the pulses is calculated. The air pressure is computed directly from the phase angle by subtracting off the zero pressure angle (measured during installation) and multiplying by the pounds per degree constant (a combination of the rim radius and the volume of the air cylinder). As the pressure in the tire increases the air in the piston compresses forcing the piston into the cylinder and thus changing the angle between the magnet mounted on the piston in the air cylinder and the fixed magnet, and thus the timing between the pulses (phase angle).

The inventor utilized and recommends the following steps in the best mode preferred embodiment.

1) Mount at least one piston cylinder mounted magnet perpendicular to another permanent magnet for reference on the inside wall of each tire of said transport vehicle;

2) Mount a sensor on the rim of each said tire of said transport vehicle;

3) Sample at a high continuous real time rate;

4) Transduce the output of said sensor into electrical pulses;

5) Communicate said pulses to an electronics module through at least one electrical conductor;

6) Monitor in real time over a broad range encompassing the entire length of said piston cylinder;

7) Calibrate the distance between said sensor and the center of each tire of said transport vehicle periodically;

8) Align noise sensitivity of the sensor parallel to the direction of travel of said transport vehicle; and 9) Display said calibrated tire pressure value for each said tire on the dashboard of said transport vehicle.

The inventor has given a non-limiting description of this invention. Due to the simplicity and elegance of the design of this invention designing around it is very difficult if not impossible. The concept of continuously monitoring tire pressure in real time would be difficult to design around. The key concept is the phase difference between the fixed and mounted magnets, so replacing any of the components with an alternate design would work. Certain changes would be obvious to persons of average skill in the art. Accordingly many changes may be made to this design without deviating from the spirit of this invention. Examples of such contemplated variations include the following:

1. The shape and size and quantity of the various members and components may be modified.
2. The color, aesthetics and materials may be enhanced or varied.
3. A different method of attaching and removing the modular components may be utilized.
4. Additional complimentary and complementary functions and features may be added.
5. A more economical version of the device may be adapted.
6. It is possible to mount the cylinder vertically instead of horizontal. In this embodiment the fixed magnet is obviated, instead the center of the pistons magnetic field is used for the reference.
7. Magnets were the easiest to handle of the sources that can generate a measurable field that will penetrate the rim. Another such material is radioactive. In this case replace the magnets with a radioactive source and the sensor pickup with a particle counter.
8. Modifying the rim to include a transparent window would allow using a light source and detector reflecting off the piston. Similar non-light based penetrating systems are possible.
9. Any compressible material, for example an air gel or foam, could replace the air cylinder. The air pockets in the gel or foam act in the same capacity as the air cylinder and eliminate the need for seals.
10. The sensor pickup is a magnetic relay, however magnetic reed switches and Hall Effect switches work just as well, if not better.
11. The electronics package is just a computing and display node, the algorithm is used to calculate the phase angle is well known but may be made more compact through programming optimization.
12. The display node is a LCD display; it could just as easily be 7-segment LED's, indicator lamps, or even a vehicle area network bus such as CAN, I2, RS232C or any other protocol.
13. Instead of two conductors only one may be employed as the ground may serve as the second conductor.
14. The system may be extended to include temperature measurement by attaching a bimetallic spring (with a magnet mounted on it) to the end of the cylinder.

Other changes such as aesthetics and substitution of newer materials as they become available, which substantially perform the same function in substantially the same manner with substantially the same result without deviating from the spirit of the invention may be made.

Following is a listing of the components uses in this embodiment arranged in ascending order of the reference numerals for ready reference of the reader.

99F=Front view of a wheel
99S=Side view of a wheel
100=Tire generally
110=Rim
120=BrakeDrum
130=Fixed Magnet
140=Sensor Transducer
150=Cylinder
160=Electronics module
170=Micro controller including a microprocessor
180=LCD Display
200=Tire in FIG. 2
230=Fixed magnet (Same as Magnet in FIG. 1)
235=Pulse generated by the fixed magnet
245=Time &/or distance between fixed magnet pulse and the piston magnet pulse in nominal position
245'=Time &/or distance between fixed magnet pulse and the piston magnet pulse in inflated position
255=Pulse generated by Piston Mounted Magnet in nominal position
255'=Pulse generated by Piston Mounted Magnet in inflated position
265=Time and/or distance between the piston mounted magnet in the nominal position and the next pulse generated by the fixed magnet.
265'=Time and/or distance between the piston mounted magnet in the inflated position and the next pulse generated by the fixed magnet.
290=FCP—The angle between the fixed magnet and the piston magnet in the nominal position.
290'=FCP'—The angle between the fixed magnet and the piston magnet in the inflated position.
300=Schematic diagram generally
311=Ground
312=Logic power Vdd
314=Alternate power Vss
320=Crystal for regulating frequency
321=Oscillator 1
322=Oscillator 2
331=10 K Ohm resistor 1
332=10 K Ohms resistor 2
340=Sensor transducer pick up
370=Microprocessor as a micro controller
400=Piston assembly generally
410=Piston Shaft
420=Seals
430=Magnets
440=Washer
450=C-Clip
500=Cylinder assembly generally
510=End cap
550=Cylinder main body
590=Collet
600=Rim assembly generally
610=Rim
620=Rim mounts
650=Cylinder main body in FIG. 6 (Same as 550 in FIG. 5)
690=Collet Definitions and Acronyms A great care has been taken to use words with their conventional dictionary definitions. Following definitions are included here for clarification.

Collet=An enclosing band or collar
3D=Three Dimensional
CRT=Cathode Ray Tube
DIY=Do It Yourself
Hall Effect=A magnetic effect discovered by Hall
FF=One rotation of the tire (FP+PF)
FCP=Phase angle at 0 PSI
FCP'=Phase angle at the pressure being measured
FP=Time it takes for the tire to rotate from the fixed magnet to piston mounted magnet
IC=Integrated Circuit Semi-conductor Chip
Integrated=Combination of two entities to act like one
Interface=Junction between two dissimilar entities
LCD=Liquid Crystal Display
LED=Light Emitting Diodes
PF=Time it takes for the tire to rotate from the piston mounted magnet to fixed magnet
ROM=Read Only Memory Sensor=A device that senses the signal energy of another device so as to communicate the same to another device or location.

Symmetrical=The shape of an object of integrated entity which can be divided into two along some axis through the object or the integrated entity such that the two halves form mirror image of each other.

Transducer=A device that coverts one type of signal or energy into another.

While this invention has been described with reference to illustrative embodiments, this description is not intended to be construed in a limiting sense. Various modifications and combinations of the illustrative embodiments as well as other embodiments of the invention will be apparent to a person of average skill in the art upon reference to this description. It is therefore contemplated that the appended claim(s) cover any such modifications, embodiments as fall within the true scope of this invention.

The inventor claims:

1. A continuous real time tire pressure monitoring and display system for a transport vehicle comprising:
   a) a piston mounted magnet in a cylinder mounted on the inside wall of each tire of said transport vehicle;
   b) a permanent magnet mounted perpendicular to said piston mounted magnet and mounted inside each said tire of said transport vehicle;
   c) a sensor and transducer means mounted on each rim of each said tire of said transport vehicle;
   d) a central processing electronics module mounted in said transport vehicle and connected to each said transducer by at least one electrical conductor;
   e) high continuous real time sampling rate means connected to and originating from said central processing electronics module;
   f) means for a broad range of continuous real time monitoring over the entire length of the piston in said piston mounted magnet where in said means for broad range of continuous real time monitoring is connected to and originates from said central processing electronics module;
   g) means for calibrating the distance between said sensor and transducer means and the center of each tire of said transport vehicle where in said means calibrating is connected to and originates from said central processing electronics module; and
   h) means for aligning noise sensitivity parallel to the direction of travel of said transport vehicle and wherein said means for aligning is connected to and originates from said central processing electronics module.

2. The continuous real time tire pressure monitoring and display system for a transport vehicle of claim 1 wherein said electronics module comprises a micro-controller and a display.

3. The continuous real time tire pressure monitoring and display system for a transport vehicle of claim 1 wherein staid transport vehicle is an automobile and said electronics module in mounted in the passenger compartment.

4. The continuous real time tire pressure monitoring and display system for a transport vehicle of claim 1 wherein staid transport vehicle is an aircraft and said electronics module is mounted in the cockpit.

5. A continuous real time tire pressure monitoring and display system for a motor vehicle comprising:
   a) a sensor means mounted on each tire of said motor vehicle for measuring the pressure in a rotating tire and representing said information as a series of magnetic pulses;
   b) a means of capturing the magnetic pulses by a transducer into a stream of digital pulses;
   c) a centralized means of processing for converting said digital pulses into an air pressure value;
   d) a means of displaying said air pressure value;
   e) a high continuous real time sampling rate means connected to said centralized means of processing;
   f) a means for a broad range of continuous real time monitoring over the entire length of the piston in said piston mounted magnet where in said means for broad range of continuous real time monitoring is connected to said centralized means of processing;
   g) a means for calibrating the distance between said sensor means and the center of each tire of said transport vehicle where in said means for calibrating is connected to said centralized means of processing; and
   h) a means for aligning noise sensitivity parallel to the direction of travel of said transport vehicle and wherein said means for aligning is connected to said centralized means of processing.

6. The continuous real time tire pressure monitoring and display system for a motor vehicle of claim 5 wherein said sensor means comprises:
   a) a piston mounted magnet in a cylinder mounted on the inside wall of each tire of said motor vehicle; and
   b) a permanent magnet mounted perpendicular to said piston mounted magnet and mounted inside each said tire of said transport vehicle.

7. The continuous real time tire pressure monitoring and display system for a motor vehicle of claim 5 wherein said transducer is mounted on each rim of each said tire of said transport vehicle.

8. The continuous real time tire pressure monitoring and display system for a motor vehicle of claim 5 wherein said means of converting said digital pulses into an air pressure value comprises an electronics module mounted in said motor vehicle and is connected to each said transducer by at least one electrical conductor.

9. A process for making the tires of a transport vehicle safer comprising the steps of:
   a) mounting at least one piston cylinder mounted magnet perpendicular to another permanent magnet for reference on the inside wall of each tire of said transport vehicle;
   b) mounting a sensor on the rim of each said tire of said transport vehicle;
   c) sampling at a high continuous real time rate;
   d) monitoring in real time over a broad range encompassing the entire length of said piston cylinder;
   e) calibrating the distance between said sensor and the center of each tire of said transport vehicle;
   f) aligning noise sensitivity parallel to the direction of travel of said transport vehicle;
   g) transducing the output of said sensor into electrical pulses;
   h) communicating said pulses to an electronics module through at least one electrical conductor;
   i) computing tire pressure value as a function of said pulses; and
   j) displaying said tire pressure value for each said tire.

10. The process for making the tires of a transport vehicle safer of claim 9 wherein said electronics module comprises a micro-controller programmed to calculate said tire pressure value as a function of said pulses.

* * * * *